Dec. 1, 1953     C. C. MOLER     2,661,450
REVERSIBLE MOTOR AND CONTROL MECHANISM THEREFOR
Filed Jan. 12, 1951     3 Sheets-Sheet 1
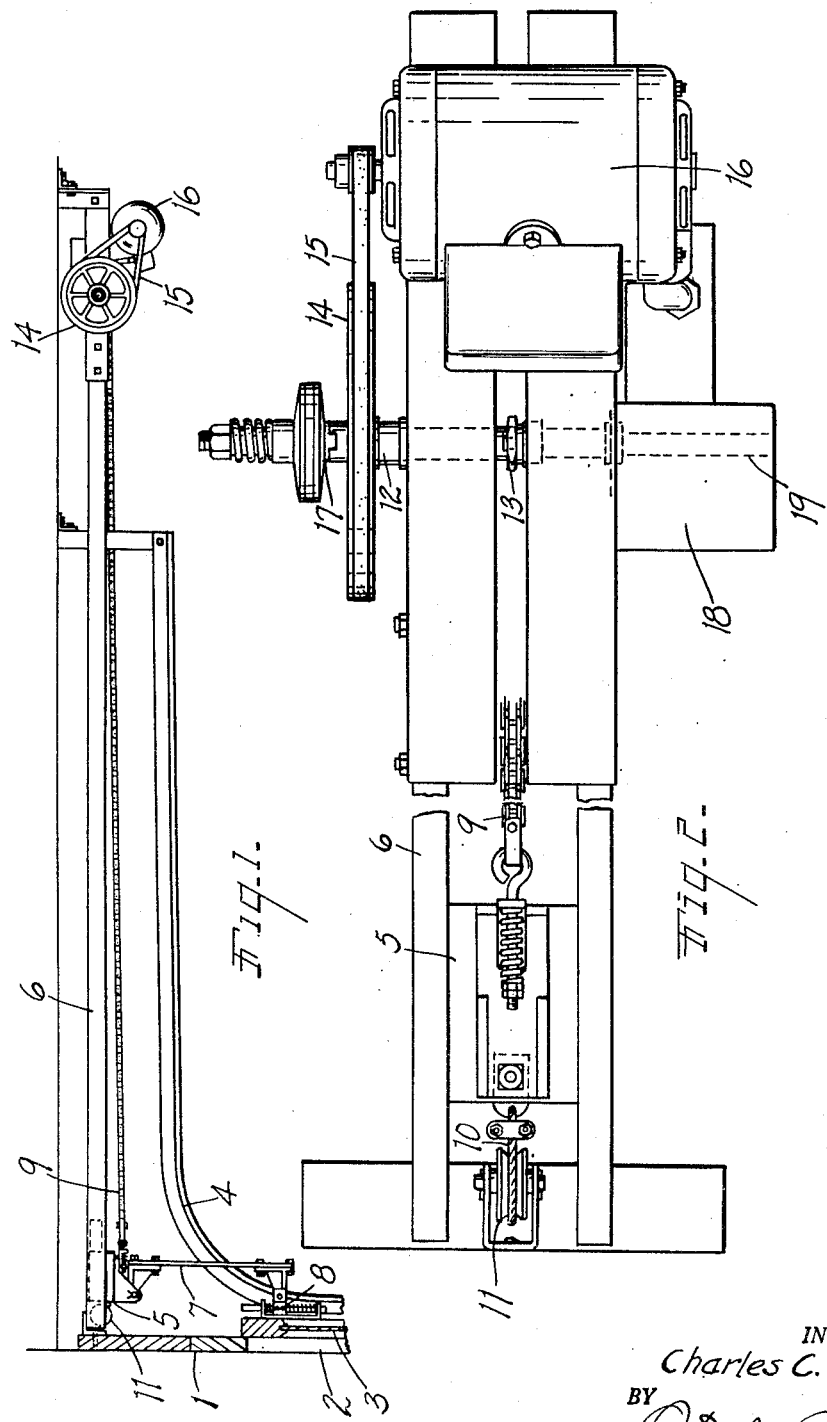
INVENTOR.
Charles C. Moler
BY
ATTORNEY.

INVENTOR.
Charles C. Moler
BY
ATTORNEY.

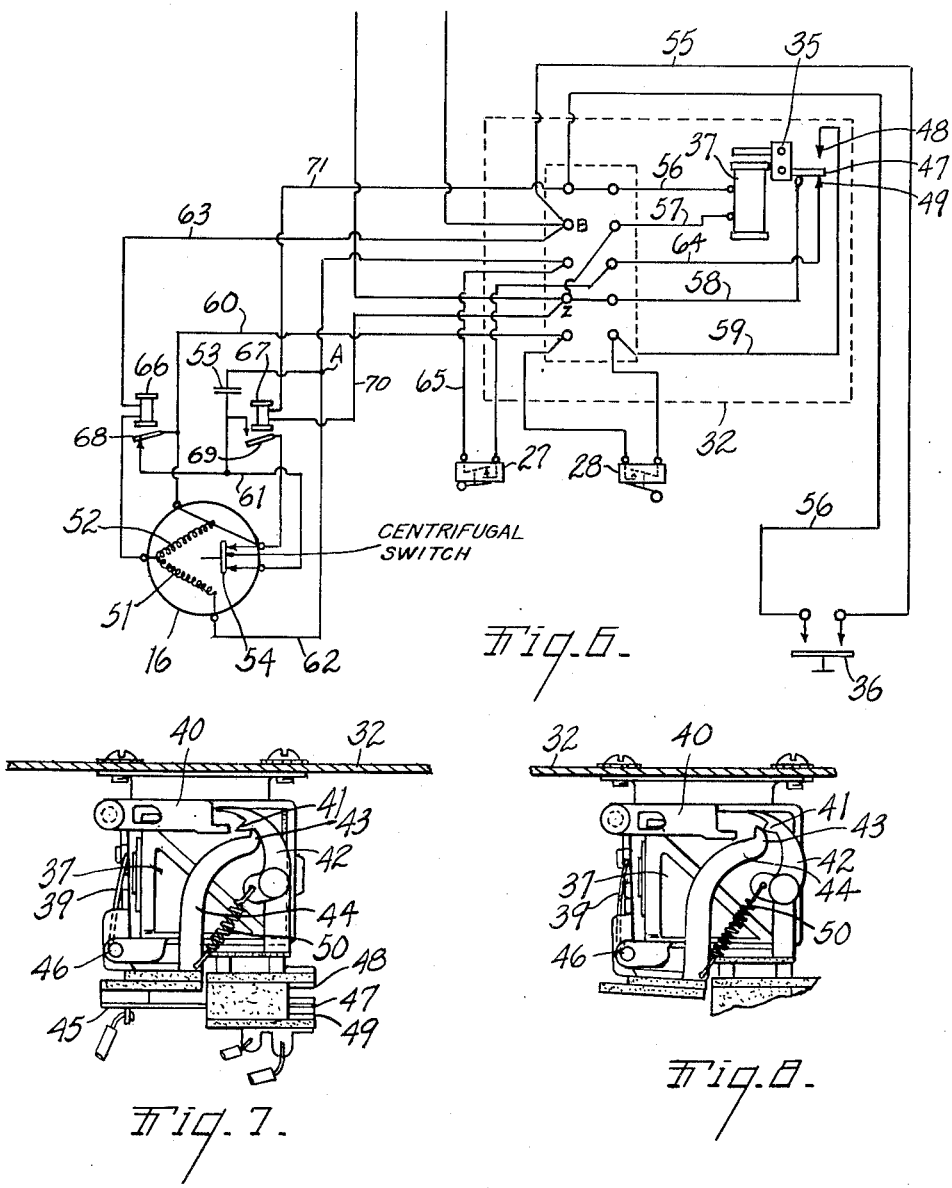

Patented Dec. 1, 1953

2,661,450

UNITED STATES PATENT OFFICE 2,661,450

REVERSIBLE MOTOR AND CONTROL MECHANISM THEREFOR

Charles C. Moler, Hartford City, Ind., assignor to Overhead Door Corporation, Hartford City, Ind.

Application January 12, 1951, Serial No. 205,789

2 Claims. (Cl. 318—202)

This invention relates to improvements in reversible motor and control mechanism therefor.

The principal objects of this invention are:

First, to provide a novel form of power driving mechanism for opening and closing vertically slidable doors which will permit the door to run automatically to its open or closed position or reverse direction instantaneously upon actuation of a control switch.

Second, to provide a control circuit for the motor of a power driven vertically slidable door which will permit the direction of movement of the door to be instantly reversed at any point in its opening or closing motion.

Third, to provide a control circuit for the motor of a power operated vertically slidable door in which automatically actuated limit switches stop the door in its opened and closed positions and in which a single manual control switch is operative to start the door operating mechanism from either of its extreme positions or reverse the direction of movement of the door intermediate of its open and closed positions.

Fourth, to provide a motor for operating a vertical slidable door with a control circuit including a solenoid controlled switch for reversing the direction of rotation of the motor and a manually controllable switch for actuating the solenoid control switch.

Fifth, to provide a control circuit for the motor of a vertically sliding door in which a manually controlled switch functions to alternately energize the motor for raising or lowering motion of the door.

Other objects and advantages relating to details of my invention will be apparent from a consideration of the following description and claims.

The drawings, of which there are three sheets, illustrate a preferred form of the door operating and controlling mechanism.

Fig. 1 is a fragmentary side elevational view of the door operating structure with the door and portions of the adjacent building structure shown in vertical cross section.

Fig. 2 is a bottom plan view of the door operating mechanism.

Fig. 6 is a circuit diagram illustrating the connections between the elements of my motor and control system.

Fig. 7 is a fragmentary enlarged side elevational view of the solenoid operated reversing switch in one position of operation.

Fig. 8 illustrates the reversing switch in its other operating position.

Figure 3:
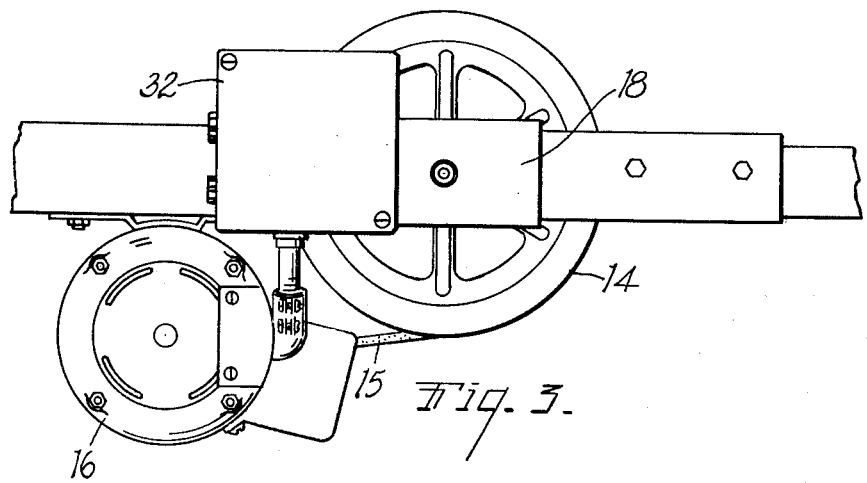
Fig. 3 is a fragmentary enlarged side elevational view of the motor and driving connections of the door operating mechanism.
Figure 4:
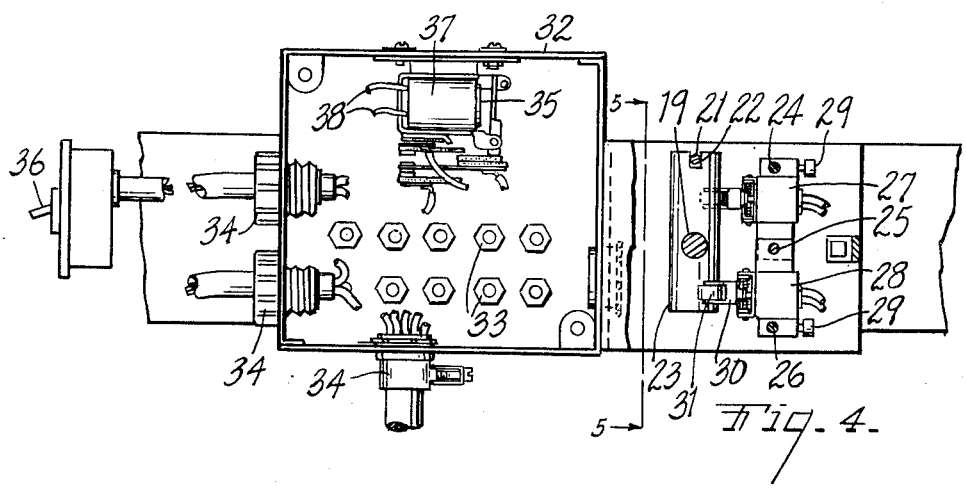
Fig. 4 is a side elevational view of the terminal box and solenoid operated reversing switch and the limit switch mounting of the control.
Figure 5:
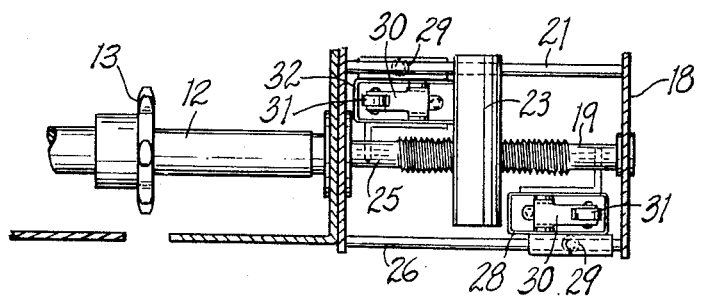
Fig. 5 is a fragmentary cross sectional view through the limit switch mounting taken along the plane of the line 5—5 in Fig. 4.

The drawings illustrate a portion of a building wall 1 having a door opening 2 therein. The opening is closed by a door 3 of the horizontally hinged sectional type and the door is guided in upward and inward closing motion along U-shaped guide rails 4 in a well-known manner. The door is moved by horizontal movement of a carriage 5 along horizontally extending tracks 6 suspended beneath the ceiling of the building. A door operating arm 7 is pivotally connected between the carriage 5 and bracket 8 yieldably mounted on the door. Movement of the carriage along the rails 6 is effected by a composite driving loop having a lower half 9 of leaf-chain construction and an upper half 10 of steel cable construction. The cable 10 is trained over an idler pulley 11 at the front ends of the rails.

The rear ends of the rails 6 rotatably support a transversely extending horizontal drive shaft 12 having a driving sprocket 13 thereon engageable with the leaf-chain portion of the loop. The shaft 12 is driven through a pulley 14 and belt 15 from an electric motor 16 supported on the under sides of the rails 6. Desirably, an overload clutch mechanism 17 is disposed in the driving connection between the pulley 14 and shaft 12. The foregoing structure and operating characteristics of the door and its operating mechanism are old and are therefore not described in greater detail.

Secured to the opposite side of the rails 6 from the pulley 14 is a limit switch housing 18 having a transversely extending screw shaft 19 journalled in the walls thereof and directly connected to the end of the drive shaft 12 for rotation with the drive shaft. The limit switch housing is further provided with a transversely extending guide rod 21 which is received in a notch 22 in the upper end of a traveling nut 23. The nut 23, which is of elongated cylindrical shape, is threadedly received on the threaded portion of the shaft 19 and due to its engagement with the rod 21, travels transversely back and forth along the threaded rod 19 as the rod is rotated with the drive shaft 12. The limit switch housing 18 also carries three transverse support rods 24, 25 and 26 which are arranged in parallel generally vertical co-planar position alongside of the screw shaft 19. The upper rod 24 slidably supports a first limit switch 27 with the bottom of the switch guidingly supported on the middle rod 25. The lower rod 26 slidably supports a second limit switch 28 with the upper side of the limit switch also guidingly engaged with the intermediate rod 25. Set screws 29 are provided for selectively clamping the limit switches in transversely adjusted positions on their respective supporting rods 24 and 26. Each of the limit switches 27 and 28 are of the minimum movement actuating type and are provided with pivoted actuating arms 30 having rollers 31 positioned to be engaged and actuated by engagement with the traveling nut 23.

Mounted on the guide rail 6 alongside of the limit switch casing 18 is a terminal box 32 having a plurality of terminals 33 therein for interconnecting the wires of the control circuit for the motor. Terminal box 32 also carries connectors 34 for the conductor cables which enter the box and forms a support and housing for a solenoid operated switch 35. A manually controllable normally open push button switch 36 is connected by a suitable two-wire cable to the terminal box and may be positioned in any convenient operating position relative to the door.

The solenoid operated switch 35 is of the type which will alternately make one circuit while breaking another each time the switch is actuated. Switches of this type are well-known and the one illustrated in the drawings is merely an example of a possible switch structure. The switch 35 includes a solenoid 37 arranged to be energized through conductors 38. The solenoid 37 attracts an armature 39 having an actuating finger 40 secured to the swinging end thereof. The actuating finger 40 alternately engages the tip 41 of a blocking lever 42 or the nose 43 of a switch operating arm 44. As is best illustrated in Figs. 7 and 8, the switch operating arm 44 is secured to a switch beam 45 pivoted to the body of the switch at 46. The switch beam 45 carries a double-faced contact 47 which is swingable between an upper contact 48 and a lower contact 49 to alternately make one circuit and break another. A spring 50 tensioned between the pivoted blocking arm 42 and the switch beam 45 bias the blocking arm and its tip 41 downwardly over the nose 43 as shown in Fig. 7 when the contact 47 is swung downwardly by one actuation of the solenoid and armature 39. Engagement of the nose 43 with the under side of the tip 41 prevents disengagement of the contact 47 from the contact 49. Upon the next actuation of the armature 39 and actuating bar 40, the tip 41 will be pushed to the right as illustrated in Fig. 8, permitting the nose 43 to rise. Tension in the spring 50 then acts to hold the contact 47 in engagement with the upper contact 48.

Fig. 6 illustrates the circuits and connections by means of which the motor 16 is connected through the reversing switch 35, manual switch 36 and limit switches 27 and 28 to a power source. The motor 16 as indicated in Fig. 6 is of the single phase reversing type having two windings 51 and 52. By means of the circuits to be described each of the windings 51 and 52 is alternatively connectable directly across the line as a running winding in one direction of rotation or through a condenser 53 as a starting winding in the other direction of rotation of the motor. The motor is provided with a centrifugally operated starting switch 54 which automatically disconnects whichever winding is operating as a starting winding when the motor reaches operating speed.

The manual control switch 36 is connected from a live terminal B through the conductors 55 and 56 to the solenoid 37 of the reversing switch. From the solenoid 37 the circuit is conducted through a conductor 57 to a second live terminal Z so that each actuation of the switch 36 will result in energization of the solenoid 37 and reversal of the movable contact 47 between the upper contact 48 and lower contact 49. The condition of the circuit as shown in Fig. 6 is that in which the motor has driven the door to one of its limits and opened the limit switch 27 and the system is at rest. A subsequent closure of the manual switch will shift the contact 47 into engagement with the contact 48 and thus complete a circuit from the live terminal Z through the conductors 58, 59, limit switch 28, and conductor 60 to the winding 52 of the motor. Concurrently, a circuit will be completed from the conductor 60 through the centrifugal switch 54 and conductor 61 to the condenser 53 and point A of the wiring system. From point A, conductor 63 provides an energizing path to the winding 51 and both windings 51 and 52 are connected to the other live terminal B by the conductor 63. Thus winding 52 functions as a running winding while winding 51 functions as a starting winding in one direction of rotation. The motor will continue to operate in this one direction, unless sooner stopped, until the limit switch 28 is opened by the traveling nut 23, thus breaking the circuit through conductor 60 to both of the windings.

If the manual control switch 36 is actuated during the previously described running cycle of the motor, the movable contact 47 will immediately shift from the contact 48 back into engagement with the contact 49 as illustrated and break the original energizing circuit to the motor through the conductor 59 and limit switch 28. A new energizing circuit will be immediately established through the conductor 64 and limit switch 27 which automatically closed immediately upon movement of the door away from its end position. The circuit is continued through conductor 65 to the previously described point A from where the winding 51 is directly energized through conductor 62 and winding 52 is energized through the condenser 53, conductor 61 and centrifugal switch 54. Both windings 51 and 53 are again connected to the other live terminal B through conductor 63. The energization of the windings is thus reversed with winding 52 becoming a starting winding and winding 51 becoming a running winding for opposite rotation of the motor.

The solenoids 66 and 67 and switches 68 and 69 illustrated in connection with the motor circuits function to improve the instantly reversible properties of the motor in providing a counter electromotor force in the motor windings by discharge of the condenser 53. It is pointed out that the switch 69 completes a bridging circuit around the centrifugal switch 54 when the solenoid 67 is energized. The solenoid 67 is connected by the conductor 70 to the live terminal Z and by the conductor 71 to the conductor 56 and from there through the manual switch 36 and conductor 55 to the live terminal B. The solenoid 67 is thus in parallel and energized along with the solenoid 37 each time the switch 36 is actuated. Thus when the motor is running on one winding, for instance, the winding 51 and the centrifugal switch 54 is open, closing of the switch 36 will simultaneously disconnect the direct connection to the winding 51 from the contact 49 and connect the winding 51 indirectly through the condenser 53, switch 69 and the newly established energizing circuit which extends directly from the contact 48 through the limit switch 28 and conductor 60 to the winding 52. This connection of the winding creates a sharp braking force in the motor so that it slows down rapidly and stops almost instantly. Of course upon slowing of the motor the switch 54 closes, and it is unnecessary to hold the solenoid 67 energy by holding the switch 36 closed until the motor starts rotating in the opposite direction.

Having thus described my invention, what I claim as new and desire to secure by Letters Patent is:

1. In combination with a reversible motor having two windings connected to a common terminal, control mechanism for said motor comprising, a threaded shaft driven by said motor, a traveling nut on said shaft, limit switches positioned to be actuated by said nut in opposite directions of movement of the nut, a reversing switch including a center contact movably positioned between two spaced terminals to alternately make contact with one of the terminals and break contact with the other, a first solenoid and actuating links operated thereby connected to move said center contact alternately into engagement with said spaced terminals upon actuation of said solenoid, energizing circuits connected between said spaced terminals and said windings at the opposite ends thereof from said common terminal, said limit switches being connected one in each of said energizing circuits, a manually controllable actuating circuit connected to energize said first solenoid, a bridging circuit connecting the opposite ends of said windings from said common terminal and including in series a condenser and a centrifugal switch associated with said motor and adapted to be opened thereby above a predetermined speed thereof, a shunt circuit connected around said centrifugal switch and including a normally open switch controlled by a second solenoid, a circuit connected to energize said second solenoid and connected in parallel with said actuating circuit to be energized therewith, and a source of electricity connected to said common terminal and said center contact of said reversing switch.

2. In combination with a reversible motor having two windings connected to a common terminal, control mechanism for said motor comprising, a control element reversibly driven by said motor, limit switches positioned to be actuated by said element in opposite directions of movement of the element, a reversing switch including a center contact movably positioned between two spaced terminals to alternately make contact with one of the terminals and break contact with the other, a first solenoid and actuating links operated thereby connected to move said center contact alternately into engagement with said spaced terminals upon actuation of said solenoid, energizing circuits connected between said spaced terminals and said windings at the opposite ends thereof from said common terminal, said limit switches being connected one in each of said energizing circuits, a manually controllable actuating circuit connected to energize said first solenoid, a bridging circuit connecting the opposite ends of said windings from said common terminal and including in series a reactance and a centrifugal switch associated with said motor and adapted to be opened thereby above a predetermined speed thereof, a shunt circuit connected around said centrifugal switch and including a normally open switch controlled by a second solenoid, a circuit connected to energize said second solenoid and connected with said actuating circuit to be energized therewith, and a source of electricity connected to said common terminal and said center contact of said reversing switch.

CHARLES C. MOLER.

References Cited in the file of this patent
UNITED STATES PATENTS

| Number | Name | Date |
| --- | --- | --- |
| 2,315,582 | Blodgett | Apr. 6, 1943 |
| 2,408,369 | Brongersma | Oct. 1, 1946 |